United States Patent [19]

Adams

[11] Patent Number: 4,888,909
[45] Date of Patent: Dec. 26, 1989

[54] FISHING LURE

[76] Inventor: Gerald A. Adams, 128 Beck St., Wadsworth, Ohio 44281

[21] Appl. No.: 270,028

[22] Filed: Nov. 14, 1988

[51] Int. Cl.[4] ............................................. A01K 85/00
[52] U.S. Cl. .................................... 43/42.16; 43/42.39
[58] Field of Search ................. 43/42.16, 42.33, 42.19, 43/42.36, 42.39

[56] References Cited

U.S. PATENT DOCUMENTS

| 211,906 | 2/1879 | Hill | 43/42.19 |
|---|---|---|---|
| 1,881,823 | 10/1932 | McKenzie | 43/42.33 |
| 2,785,500 | 3/1957 | Ashley | 43/42.36 |
| 3,104,486 | 9/1963 | Gressard | 43/42.39 |
| 3,555,717 | 1/1971 | Gautsche | 43/42.39 |
| 3,750,325 | 8/1973 | Feltman | 43/42.19 |

Primary Examiner—M. Jordan
Attorney, Agent, or Firm—Frederick K. Lacher

[57] ABSTRACT

A fishing lure having a head member with a straight bore and a core wire extending through the bore from a leading end to a trailing end of the core wire. A fishing line connection is located at the leading end in a position spaced from the axis of the bore to maintain the lure in a generally horizontal position. The head member has a leading face at an angle to the axis of the bore for pulling the lure downward and from side-to-side as it is pulled through the water. Body means such as a spinner blade and at least one swivel bead are mounted on the core wire between the head member and the trailing end of the core wire where a hook is attached.

14 Claims, 2 Drawing Sheets

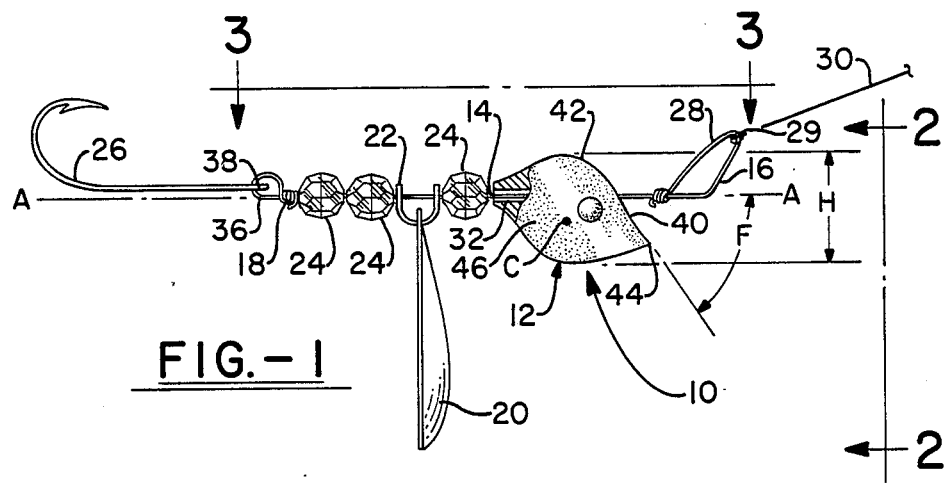
FIG.-1
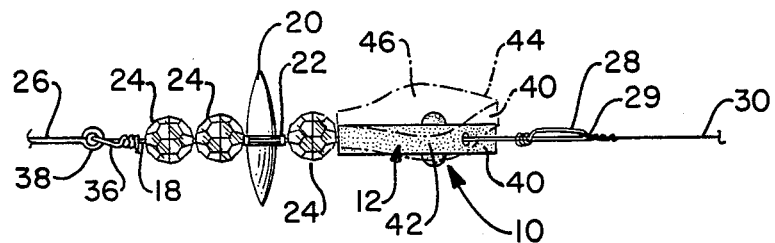
FIG.-3
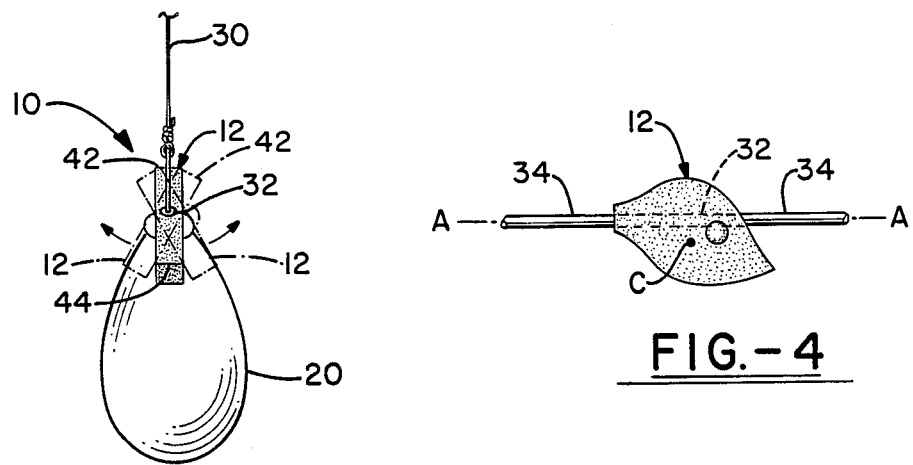
FIG.-2
FIG.-4

FISHING LURE

This invention relates to a fishing lure and especially to a spinnerbait or fish such as walleyes. Heretofore lures of reflective material have been used; however, the reflected part of the lure has not had sufficient movement to attract the fish. The fishing lure of this invention provides a head member pivotally supported on a core wire for swinging movement. The head member has a bore extending through the head with a diameter greater than the diameter of the core wire so that the head member can swing freely on the core wire. The bore is located at a position spaced from the center of gravity of the head member and a leading face of the head member is sloped at an angle to the axis of the bore. With this construction, the head member will swing back and forth on the core wire producing a wobbling action as the lure is pulled through the water. The head member has a colored reflecting surface and produces a flashing that fish can see and a wobble that fish can feel.

In accordance with an aspect of this invention there is provided a fishing lure comprising a head member, a core wire extending from a leading end through the head member to a trailing end of the core wire, a hook connected to the trailing end of the core wire, a straight bore extending through the head member with the core wire extending through the bore, the bore having a diameter greater than the diameter of the core wire so that the head member can swing freely on the core wire, body means connected to the core wire at a position between the head member and the trailing end of the core wire, a leading end connecting means at the leading end of the core wire for attachment to a fishing line, and reflecting means on a surface of the head member.

In accordance with another aspect of the invention there is provided a head member for a fishing lure comprising a metal body, a straight bore extending through the body and the center of gravity of the head member being spaced from the bore to provide swinging movement of the head member when mounted on a core wire.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

In the annexed drawings:

FIG. 1 is a side elevation of a fishing lure embodying the invention with part of the head member being broken away to show the core wire in the bore of the head member.

FIG. 2 is an enlarged front end view taken along line 2—2 in FIG. 1 with the position of the head member shown in dot-dash lines swinging to the left of center.

FIG. 3 is a plan view taken along line 3—3 in FIG. 1 with the hook broken away and the position of the head member shown in dot-dash lines swinging to the left of center.

FIG. 4 is an elevation of the molded head member with the removable molding wire before removal thereof.

Figure 5:
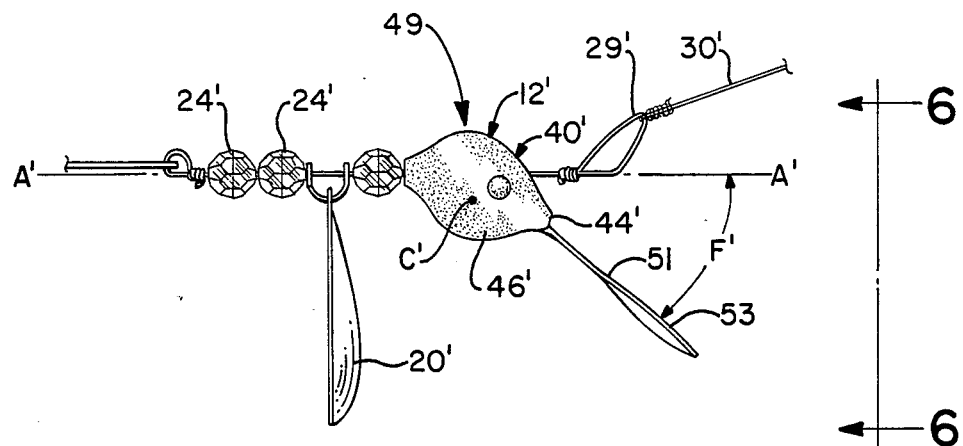
FIG. 5 is an elevation like FIG. 1 showing a modification of the invention with the hook broken away.

Referring to FIGS. 1, 2 and 3, a fishing lure 10 embodying the invention is shown which has a head member 12 mounted for swinging movement on a core wire 14 having a leading end 16 and a trailing end 18. Body means for the fishing lure 10 may include a spinner blade 20 connected to the core wire 14 by a hanger 22 and swivel beads 24 strung on the core wire between the spinner blade 20 and head member 12 and between the spinner blade and the trailing end 18 of the core wire. A hook 26 may be connected to the trailing end 18 of the core wire 14 and the core wire bent in an elongated loop 28 having a leading end connecting means 29 to which a fishing line 30 may be tied.

Extending through the head member 12 is a straight bore 32 which has a diameter greater than the diameter of the core wire 14 to provide freedom of swinging movement of the head member on the core wire. Preferably, the head member 12 has a center of gravity C spaced from a bore axis A—A so that the head member will hang on the core wire 14 with the center of gravity below the bore axis.

Referring to FIG. 4, one way of positioning the bore 32 in the head member 12 is illustrated. The head member 12 is cast in a mold with a molding wire 34 positioned in the mold so that when the metal is poured, it will locate the bore 32. The head member 12 is preferably removed from the mold with the molding wire 34 before the poured metal is hardened. Then the molding wire 34 is pulled out of the head member 12 creating the straight bore 32.

As shown in FIG. 1, a trailing end loop 36 of the core wire 14 is connected to an eye 38 of the hook 26. The trailing end loop 36 is positioned in a plane at a predetermined angle to the plane of the elongated loop 28 to maintain the hook 26 in an upright position as the lure 10 is pulled through the water by the fishing line 30. In this case, the angle is zero degrees since the trailing end loop 36 and the elongated loop 28 are in substantially the same plane. The leading end connecting means 29 of the elongated loop 28 is spaced from the axis A-A of the bore 32 so that as the lure 10 is pulled through the water, the core wire 14 will be in a substantially horizontal position.

As shown in FIGS. 1, 2 and 3, the head member 12 has a substantially flat leading face 40 with an upper edge 42 and a lower edge 44. The leading face 40 is sloped at angle F of about sixty degrees between the leading face and the axis A—A of the bore 32. Preferably the angle F of the leading face 40 is sloped from about twenty degrees to about seventy degrees. The distance between the bore 32 and the upper edge 42 is less than the distance between the bore and the lower edge 44. As a result, when the fishing lure 10 is pulled through the water by the fishing line 30, the head member 12 will be urged into a vertical position such as that shown in full lines in FIGS. 1, 2 and 3 because the center of gravity C is located below the bore 32. Then as the lure 10 is moved through the water, the water impinging against the leading face 40 will urge the lure downward and tend to flow to the left or right. This will cause the head member 12 to swing to a position such as that shown in dot-dash lines about the core wire 14. As soon as the head member 12 swings to one side or the other, the water flow will swing the head member in a greater arc about the core wire 14 until it reaches a fairly high point at which time the weight of the head member will swing the head member back to the vertical position with the momentum taking the head member to the other side. It is believed that this action against the leading face 40 and the positioning of the center of gravity below the bore axis A—A causes the novel wobbling action of the head member 12.

The head member 12 has reflective surfaces 46 which may be provided by painting and/or anodizing the metal head member and these reflective surfaces produce a flashing of the head member as it is pulled through the water. The reflective surfaces 46 may be of different anodized colors and match the colors of the swivel beads 24 and spinner blade 20.

In the preferred embodiment, the head member 12 has a height H of about one-half inch (1.27 cm) and the center of gravity is about one-quarter inch (0.64 cm) from the upper edge 42 while the bore axis A—A is about one-eighth inch (0.32 cm) below the upper edge 42. The leading end connecting means 29 of the elongated loop 28 is positioned about one-half inch (1.27 cm) away from the core wire 14. The head member 12 is of a heavy metal such as lead providing a weight forward spinnerbait type lure. Different ounce increments from ¼ to 1 oz. (7.13 to 28.35 grams) are obtained by varying the thickness of the head member 12. All head members 12 are of the same profile; however, the thickness varies.

The spinner blade 20 may be of various sizes in the range of from about three-quarter inch (1.91 cm) to one-half inch (1.27 cm) long. This is for the fishing lure 10 having a hook 26 one and one-half inches (3.81 cm) long and with a hook opening of about one-half inch (1.27 cm). The length of the core wire 14 may be around two and three-quarter inches (6.99 cm). With this construction, suitable flashing and wobbling has been provided to catch fish such as walleyes.

Figure 6:
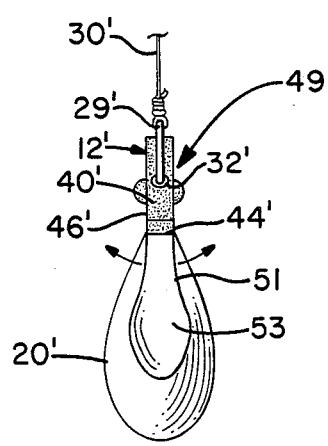
FIG. 6 is a front end view taken along line 5—5 in FIG. 4.

Referring to FIGS. 5 and 6, a modified fishing lure 49 is shown which is substantially the same as the fishing lure 10 except that a diving spoon member 51 is mounted on the lower edge 44' of the head member 12'. Where the parts of this modified fishing lure 49 are the same as the parts of the fishing lure 10, they are identified with the same numerals and a prime mark.

The diving spoon member 51 has a sloping face 53 disposed generally at the same angle F' at which the leading face 40' is sloped. The spoon member 51 may be wider than the head member 12' and have a depression in the sloping face 53 so that as the modified fishing lure 49 is pulled through the water by the fishing line 30' the diving spoon member 51 will cause the lure to be pulled downward a further distance than the fishing lure 10 shown in FIGS. 1, 2 and 3. In all other respects, the center of gravity C' and the position of the bore 32' are substantially the same to provide the wobbling action described hereinabove except it will be at a greater depth. The reflective surfaces 46' may be colored by painting or anodizing to simulate different kinds of bait. Also other body means may be substituted for the spinner blade 20' and the swivel beads 24'.

While certain representative embodiments and details have been shown for the purpose of illustrating the invention, it will be apparent to those skilled in this art that various changes and modifications may be made therein without departing from the spirit or scope of the invention.

What is claimed is:

1. A fishing lure comprising a head member, a core wire extending from a leading end through said head member to a trailing end of said core wire, a hook connected to said trailing end of said core wire, a straight bore extending through said head member with said core wire extending through said bore, said bore having a diameter greater than the diameter of said core wire so that said head member can swing freely on said core wire, body means connected to said core wire at a position between said head member and said trailing end of said core wire, a leading end connecting means at said leading end of said core wire for attachment to a fishing line, and reflecting means on a surface of said head member.

2. A fishing lure according to claim 1 wherein said head member contains metal to provide the desired weight and pull said leading end of said lure downward in operation.

3. A fishing lure according to claim 2 wherein the center of gravity of said head member is spaced from said bore to provide a swinging action of said head member on said core wire.

4. A fishing lure according to claim 3 wherein said leading end connecting means is spaced from an axis of said bore for attachment of said line at a position spaced from said core wire to pull said lure through the water with said core wire in a generally horizontal disposition.

5. A fishing lure according to claim 4 wherein said trailing end of said core wire has a trailing end loop in a plane at a predetermined angle to the plane of said leading end connecting means to maintain said hook in an upright position.

6. A fishing lure according to claim 3 wherein said head member has a leading face disposed at an angle to the axis of said bore for pulling said head member downward and swinging said head member from side-to-side as it is pulled through the water.

7. A fishing lure according to claim 6 wherein said bore has an axis positioned about halfway between an upper edge of said leading face and said center of gravity.

8. A fishing lure according to claim 6 wherein said leading face is disposed at an angle of from about twenty degrees to about seventy degrees to the axis of said bore.

9. A fishing lure according to claim 6 wherein said leading face of said head member is substantially flat and has an upper edge and a lower edge with the distance from said bore to said upper edge being less than the distance from said bore to said lower edge whereby said lure is pulled in the direction of said lower edge upon movement through the water.

10. A fishing lure according to claim 9 wherein a diving spoon member is mounted on said head member at said lower edge of said leading face for pulling said lure down and in the direction of said diving spoon member upon movement through the water.

11. A fishing lure according to claim 5 wherein said body means includes a spinner blade attached to said core wire.

12. A fishing lure according to claim 11 wherein said body means further includes swivel beads on said core wire between said head member and said spinner blade and between said spinner blade and said trailing end of said core wire.

13. A head member for a fishing lure comprising a metal body, a straight bore extending through said body for mounting rotatably on a core wire, the center of gravity of said head member being spaced from said bore, a substantially flat leading face at an angle to the axis of said bore having an upper edge and a lower edge with the distance from said bore to said upper edge being less than the distance from said bore to said lower edge for pulling said head member toward said lower edge in a downward direction and swinging said head member from side-to-side about said core wire as said head member is pulled through the water.

14. A head member according to claim 13 wherein a diving spoon member is mounted on said lower edge of said leading face for pulling said lure downward and in the direction of said diving spoon member on movement through the water.

* * * * *